Oct. 17, 1944.   P. M. J. S. DE GIACOMONI   2,360,766
MOTOR CONTROL SYSTEM
Filed March 26, 1942
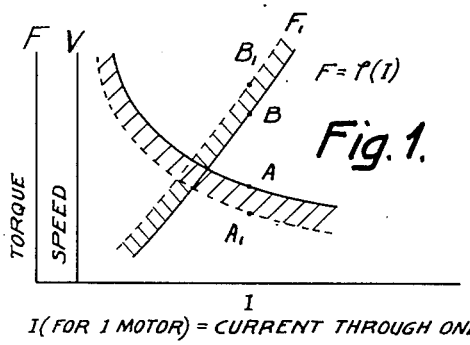
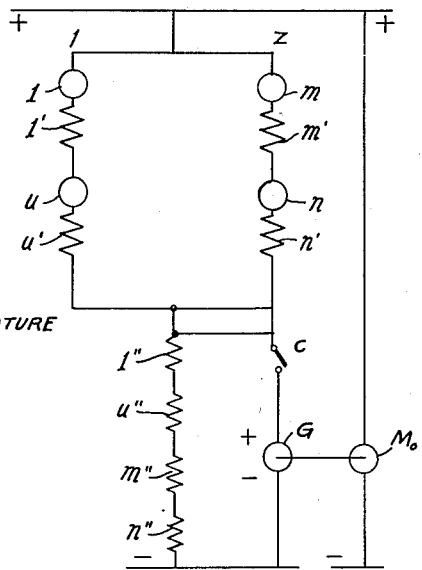
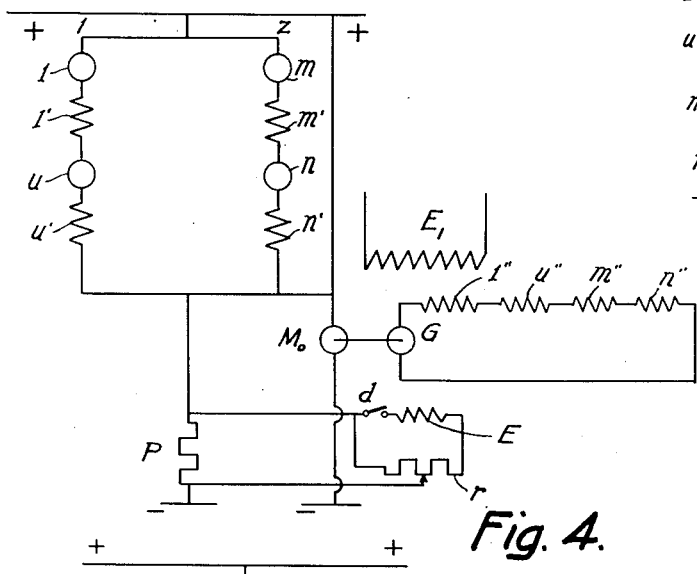
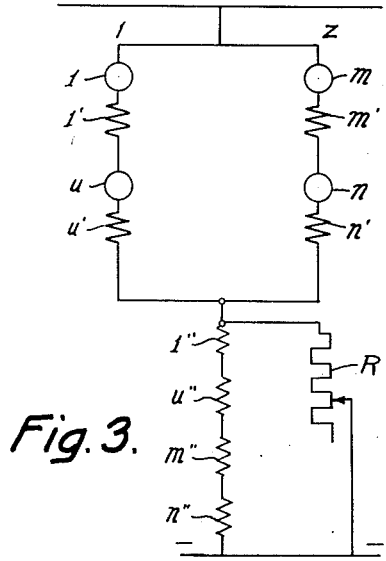
INVENTOR
Paul Marie Jacques Severin De Giacomoni
By
ATTORNEY.

Patented Oct. 17, 1944

2,360,766

UNITED STATES PATENT OFFICE 2,360,766

MOTOR CONTROL SYSTEM

Paul Marie Jacques Séverin de Giacomoni, Paris, France; vested in the Alien Property Custodian Application March 26, 1942, Serial No. 436,356
In France December 30, 1940

9 Claims. (Cl. 172—179)

This invention relates to series-parallel and parallel connections for direct current motors with split up exciting windings.

It is well known that one of the methods for the regulation of the speed of electric locomotives and rail motor cars working with direct current consists in varying the field of the field magnets of the traction motors for instance by one or the other of the following means:

Connection of resistances in parallel with the field magnets;

Separate feeding of the field magnet windings by the mains with interposition of variable resistances;

Supply of current to the field magnet windings by an independent and variable source of current (battery, motor-generator unit and the like).

As regards this latter means it is known, more particularly, to regulate the speed of series motors with split up exciting windings or of compound motors by means of an auxiliary dynamo driven by a motor supplied with current from the mains and shunted on a fraction of the split up exciting windings. In the case of a plurality of similar motors connected in parallel or in series-parallel, however, this method leads to the use of as many auxiliary dynamos as there are motor groups connected in parallel, which renders the plant cumbersome, expensive and difficult to control. On the other hand, if the number of dynamos is reduced by using a single dynamo for regulating the motors in two or more parallel branches, it becomes difficult to obtain equal current distribution in the various windings, and the space required for the apparatus remains large.

The present invention has for its object to provide a particular method of connection for any number $n$ of motors distributed in $z$ groups or branches connected in parallel and comprising each $$\frac{n}{z} = u$$

motors connected in series, the said connection supplying supplementary characteristics of the series form which increase the number of the regulation curves of the machine and permit shunting by means of auxiliary dynamos or of resistances in a range which is more extended than with typical connections and this with important constructive advantages.

According to the invention, the exciting winding or field winding of each motor is split up in two fractions, one of which for each motor is traversed by the current which flows through the branch in which the armature and the changing over windings of its motor are inserted. On the contrary, all the other fractions, which for convenience will be called "complementary fractions" but without indicating their relative value with respect to the first named fractions, are combined with one another and connected in series in order to form a single chain for all the motors which may be connected in either of two ways.

On the one hand, this chain may be connected in series with the whole group of parallel branches, the said chain being then, according as it is shunted or not shunted, traversed by the whole or a part of the sum of the currents which flow through the above mentioned branches. On the other hand, the chain may be connected to and supplied exclusively by one or more auxiliary dynamos the whole or a part of the exciting windings of which is traversed itself by a current which is proportional to the sum of the currents which flow through the branches connected in parallel.

In the first connection, the regulation of the speed of the machine is obtained by connecting one or more auxiliary dynamos or a variable resistance in shunt with the complementary exciting chain, the current which flows through the said chain being then either the algebraic sum (in the case of the auxiliary dynamo) or the arithmetical difference (in the case of the resistance) of the currents which flow, on the one hand, through the whole of the parallel branches and, on the other hand, through the above mentioned shunt respectively.

In the second connection the current which flows through the complementary exciting chain is solely a function of the sum of the currents which flow through the parallel branches.

In the appended drawing, which shows amongst others and by way of example a plurality of forms of execution of the invention.

Figure 1 shows, jointly with the curves of the normal series-motor, the curves of force or torque and speed as functions of the intensities which are obtained with the first connection described above.

Figure 2 is a diagram showing the first connection described above, the complementary chain being shunted by an auxiliary dynamo.

Fig. 3 is a diagram similar to Figure 2 but with shunting by a variable resistance.

Fig. 4 is a diagram showing the separated supply of the complementary fields by means of an auxiliary dynamo the exciting windings of which are traversed by the whole of the current which flows through the parallel branches.

As shown in Fig. 2 for purposes of example, the plant comprises four motors ($n=4$) grouped in two parallel branches ($z=2$) each comprising two motors in series ($u=2$). Each of the four motors $l$, $u$, $m$, $n$ has a part of its exciting winding $l'$, $u'$, $m'$, $n'$ in series with its armature in the respective parallel branch. However, the complementary parts of the exciting windings $l''$, $u''$, $m''$, and $n''$ are connected in series with one another in a single chain which in turn is connected in series with the group of parallel branches so that the current which flows through the said chain $l'' \ldots n''$ is equal to the sum of the currents which flow through each of the said branches $l \ldots z$. The whole arrangement is inserted between the positive and negative terminals of a direct current supply.

In Fig. 2, as in the other figures, the chain is shown on the negative side of the group of parallel branches, but it will be understood that it could as well be on the positive side thereof.

The operation of this connection as thus far described is as follows (see Figure 1):

$a$ being the number of turns of the winding fraction $l'$ of the motor $l$ and $b$ the number of turns of the complementary winding $l''$ of the said motor, and $I$ designating the current which flows through each of the branches $l \ldots z$, it is evident that for a normal series motor the field would be a function of $(a+b)I$, while in the above described connection it will be, of course, a function of $(a+zb)I$; that is to say that for any intensity $I$ flowing through the armature, the points (A, B) of the characteristic curves $V=f(I)$ and $F=\phi(I)$ of the typical series motor will be replaced by points ($A_1$, $B_1$), $A_1$ being above A and $B_1$ below B.

For different values of $I$ a series of points $A_1$ and $B_1$ will be obtained, forming the two curves $V_1$ and $F_1$ respectively which are shown in chain lines in Figure 1 while the normal curves V and F on the contrary are shown in full lines.

According to the respective positions of the curves $F_1$, $V_1$ with respect to the curves F, V, those skilled in the art will immediately see that the regulation zone which is possible for every shunting is increased by the hatched areas.

For obtaining economical torque and speed curves from the fundamental curves $F_1$, $V_1$, one or more dynamos grouped in series, in parallel or in series-parallel may be connected across the terminals of the common series-chain $l'' \ldots n''$.

Fig. 2 shows only one dynamo G with its driving motor $M_0$ connected across the terminals of the supply mains.

The dynamo G can be disconnected by the opening of a contacting switch $c$ and its regulation is effected in any suitable manner according to the form of the curves which are to be obtained.

When normally working the operation is as follows:

Assuming that the contacting switch $c$ is open, the whole plant works like a group of motors connected in series-parallel with reinforced fields, as results from the above explanations.

On the contrary, assuming that the contacting switch $c$ is closed and that the dynamo G is not excited, the current issued from the branches connected in parallel will be partly shunted and flow through the said dynamo which then works like a constant resistance.

Now, if the dynamo receives a predetermined excitation independent from the current which flows through the armatures, then according to whether the voltage at the terminals of the said dynamo is higher or lower than the voltage at the entrance into the complementary chain $l'' \ldots n''$, the current flowing through the said chain will be reinforced or diminished. However, this current cannot be brought to zero, since for a zero value of the voltage of the dynamo (in case of the maximum output in the latter) one would simply obtain a shunting of a certain value of the windings connected in series.

In the case when the excitation of the dynamo is dependent on the current which flows through the armature, the voltage at the terminals of the said dynamo will vary with the said current providing a curve having a different form.

In order to obtain not only the zero value of current in the windings of the chain $l'' \ldots n''$ (the series-motors working solely with the windings $l' \ldots n'$), but also a change of direction of the current in the said windings, it is possible, by known means, to reverse the polarity of the dynamo. From this moment the more the voltage difference at the terminals of the latter is increased, the more the resulting current which normally flows through the complementary chain will be diminished until one obtains the reversal of the said resulting current, i. e. working with recuperation.

If one wishes to maintain the integral form of the characteristic of series-motors it is possible, as shown in Figure 3, to connect an adjustable resistance R across the terminals of the complementary chain $l'' \ldots n''$ instead of the auxiliary dynamo G provided for in the connection according to Figure 2.

The operation is self-evident.

Of course, such an arrangement excludes recuperation which cannot be obtained merely by adjustment of the resistance R.

From the constructive point of view and for a certain output the dimensions and weights of the auxiliary dynamo or dynamos of the arrangement according to Figure 2 would exceed the values admissible for rolling stock. In such case the connection shown in Fig. 4 may be used, in which a series chain formed by the complementary field windings $l'' \ldots n''$ is supplied separately and exclusively by the auxiliary dynamo G which, being independent from the armature circuit, has no longer to sustain the flow of an important fraction of the sum of the currents of the parallel branches and can, therefore, have much smaller dimensions than in the connection according to Figure 2. Then the $z$ parallel branches can be simply and solely connected with the negative and positive terminals of the supply.

However, without a corrective such as shown in this figure, the connection obtained in this manner represents the integral connection of motors with a form of compound characteristics. Now, it may be necessary, in certain traction cases, to obtain curves the forms of which are much nearer to series-characteristics, which can readily be accomplished by providing the dynamo with an adjustable exciting winding traversed by the whole current which flows through the parallel branches.

As shown in Figure 4, it is sufficient to connect an adjustable resistance $r$ in parallel with the exciting winding E.

It will be apparent that the variation of the voltage at the terminals of the dynamo and, by way of consequence, the current which flows through the complementary chain $l'' \ldots n''$, will be proportional to the intensity which flows through the above mentioned winding E. More particularly, for a predetermined adjusting position of the resistance $r$, the direction of the variation of the current in the chain $l'' \ldots n''$ will be the same as in each of the armatures of the motors.

It is obvious that working with recuperation may also be obtained by the addition of a second separated winding $E_1$ to the dynamo; then the winding E, which is maintained in the circuit for traction running, can if desired be eliminated for working with recuperation by opening a switch $d$.

From the point of view of practical construction and for outputs which are higher than a certain value, the above form of connection of the winding E and of the resistance $r$ can lead to dimensions and weights which are prohibitive. In such case the current flowing through said winding and resistance can be reduced by a shunt resistance $p$.

For recuperation and stability of working this latter kind of connection is the same as the former.

More particularly, the electric stability of the connections according to Fig. 4 is proved by the fact that for each variation of the voltage in the mains the intensity of the current in the field windings $l' \ldots n'$ and $l'' \ldots n''$ tends to vary in the same direction as in a series-motor.

Although as described above a fraction of the field winding of each of the $n$ motors is always in series with its armature in the branch in which the latter is connected, it is evident that these fractions could be omitted, the complementary chain $l'' \ldots n''$ comprising the totality of the exciting fields of the motors and forming a single exciting chain receiving the sum of the currents which flow through the parallel branches. Of course, shunting through auxiliary dynamos or through a resistance would be effected exactly as before as shown in Figures 2 and 3.

What is claimed is:

1. A system for series-parallel connection of direct current motors having split exciting windings comprising a plurality of motors divided in groups with the motors in each group connected in series with one another and forming one of a plurality of parallel-connected branch circuits, each of said motors having its exciting windings split into complementary parts, one of said parts for each motor being connected to receive the series current in the branch in which its motor is connected, the other of said parts for all of said motors being connected together in series to form a single chain, and means for supplying to the winding parts in said chain a current proportional to the sum of the currents through all of said branches.

2. A system for series-parallel connection of direct current motors comprising a plurality of motors divided into groups of equal number of motors, the motors of each group being connected in series with each other and each series-connected group forming one of a plurality of parallel-connected branch circuits corresponding in number to the number of groups, at least part of the exciting winding of each motor being connected in series to form a single chain and said chain being connected in series with said plurality of parallel-connected branches.

3. A system for series-parallel connection of direct current motors having split exciting windings, comprising a plurality of motors divided into groups of equal number of motors, the motors of each group being connected in series with each other and each series-connected group forming one of a plurality of parallel-connected branch circuits corresponding in number to the number of groups, each of said motors having its exciting windings split into complementary parts, one of said parts for each motor being connected in series in the same branch with its motor, the other of said parts for all of said motors being connected together in series to form a single chain, and means for supplying to the winding parts in said chain a current proportional to the sum of the currents through all of said branches.

4. A system as defined in claim 3, wherein said chain is connected in series with said plurality of parallel-connected branches.

5. A system as defined in claim 3, wherein said chain is connected in series with said plurality of parallel-connected branches, and comprising speed-regulating means connected in shunt with said chain.

6. A system as defined in claim 3, wherein said chain is connected in series with said plurality of parallel-connected branches, and speed-regulating means comprising an adjustable resistance connected across the terminals of said chain.

7. A system as defined in claim 3, wherein said chain is connected in series with said plurality of parallel-connected branches, and speed-regulating means comprising a generator connected across the terminals of said chain, and means for supplying to said generator an exciting current proportional to the sum of the currents through all of said branches.

8. A system as defined in claim 3, wherein said chain is excited separately from said plurality of parallel-connected branches, and comprising a generator in circuit with said chain for supplying exciting current thereto, and means for supplying to said generator an exciting current proportional to the sum of the currents through all of said branches.

9. A system as defined in claim 3, wherein said chain is excited separately from said plurality of parallel-connected branches, and comprising a generator in circuit with said chain for supplying exciting current thereto, said generator having two field windings, means for supplying to one of said field windings an exciting current proportional to the sum of the currents through all of said branches, and means for separately exciting the other of said field windings for recuperative operation.

PAUL MARIE JACQUES SÉVERIN
DE GIACOMONI.